US008950969B2

(12) United States Patent
Klaukien

(10) Patent No.: US 8,950,969 B2
(45) Date of Patent: Feb. 10, 2015

(54) FORCE TRANSMISSION FITTING FOR LIGHTWEIGHT COMPONENTS

(75) Inventor: Frank-Michael Klaukien, Ellerbek (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/523,070

(22) Filed: Jun. 14, 2012

(65) Prior Publication Data

US 2012/0251235 A1   Oct. 4, 2012

Related U.S. Application Data

(63) Continuation of application No. PCT/EP2010/069379, filed on Dec. 10, 2010.

(60) Provisional application No. 61/286,482, filed on Dec. 15, 2009.

(30) Foreign Application Priority Data

Dec. 15, 2009 (DE) .......................... 10 2009 058 359

(51) Int. Cl.
F16B 7/00 (2006.01)
F16B 12/36 (2006.01)
(Continued)

(52) U.S. Cl.
CPC ...................................... F16B 5/01 (2013.01)
USPC ........................... 403/292; 403/404; 244/131

(58) Field of Classification Search
CPC ........ F16B 5/004; F16B 5/002; F16B 7/0446; B64C 1/12; B64C 1/26
USPC ......... 403/167, 168, 179, 187, 192, 291, 292, 403/293, 404, 408.1; 411/82, 258; 244/119, 244/131, 132
See application file for complete search history.

(56) References Cited

U.S. PATENT DOCUMENTS 2,082,916 A * 6/1937 Stratford ....................... 451/530
2,225,551 A * 12/1940 Clinton ...................... 242/118.6
(Continued)

FOREIGN PATENT DOCUMENTS

DE       4440397 C1    9/1995
DE      19903436 A1    8/2000
(Continued)

OTHER PUBLICATIONS

German Patent Office, German Office Action dated Jun. 2, 2010 for German Patent Application No. 10 2009 058 359.9.
(Continued)

Primary Examiner — Daniel P Stodola
Assistant Examiner — Nahid Amiri
(74) Attorney, Agent, or Firm — Ingrassia Fisher & Lorenz, P.C.

(57) ABSTRACT

A force introduction fitting for lightweight constructional components comprises at least one radial force introduction surface, at least one axial force introduction surface, and at least one receiving means for holding the force introduction fitting and for introducing loads into the force introduction fitting. The radial force introduction surface and the axial force introduction surface enclose a hollow space. The radial force introduction surface and the axial force introduction surface form a single-piece component. Such a force introduction fitting can be produced with the use of a selective laser melting method. The force introduction fitting can thus be adjusted in a particularly flexible manner to the load conditions, comprises particularly advantageous materials characteristics and features a lightweight construction.

16 Claims, 6 Drawing Sheets

(51) Int. Cl.
*F16B 13/00* (2006.01)
*F16B 5/01* (2006.01)

(56) References Cited

U.S. PATENT DOCUMENTS

| | | | |
|---|---|---|---|
| 2,593,714 A | | 4/1952 | Robinson |
| 2,877,937 A | * | 3/1959 | Weir .......................... 222/452 |
| 2,922,262 A | * | 1/1960 | Atkins ........................ 15/230.1 |
| 3,137,887 A | * | 6/1964 | Mannino et al. ................ 16/2.1 |
| 4,444,365 A | * | 4/1984 | Heuberger ..................... 244/48 |
| 4,603,821 A | | 8/1986 | White |
| 4,898,756 A | | 2/1990 | Oefner |
| 4,938,816 A | | 7/1990 | Beaman et al. |
| 5,085,382 A | | 2/1992 | Finkenbeiner |
| 5,374,017 A | * | 12/1994 | Martin et al. .................. 248/56 |
| 5,806,302 A | * | 9/1998 | Cariola et al. ................. 60/204 |
| 6,129,311 A | * | 10/2000 | Welch et al. ............. 244/117 R |
| 6,264,412 B1 | | 7/2001 | Nakamura et al. |
| 6,330,985 B1 | * | 12/2001 | Manteiga et al. ............... 244/54 |
| 6,708,637 B1 | | 3/2004 | Webster |
| 7,182,291 B2 | | 2/2007 | Westre et al. |
| 7,506,444 B2 | | 3/2009 | Weise |
| 7,575,244 B2 | | 8/2009 | Howell et al. |
| 7,641,427 B2 | | 1/2010 | Zhang |
| 7,984,547 B2 | | 7/2011 | Steinhardt |
| 2011/0253878 A1 | | 10/2011 | Klahn et al. |

FOREIGN PATENT DOCUMENTS

| | | |
|---|---|---|
| EP | 1197669 A1 | 4/2002 |
| FR | 2883939 A1 | 10/2006 |
| GB | 303028 | 4/1980 |
| RU | 2143365 C1 | 12/1999 |

OTHER PUBLICATIONS

German Patent Office, German Office Action dated Feb. 16, 2011 for German Patent Application No. 10 2008 044 759.5.

International Searching Authority, International Search Report dated Mar. 15, 2010 for International Application No. PCT/EP2009/059857.

International Searching Authority, International Search Report dated Feb. 4, 2011 for International Application No. PCT/EP2010/069379.

Russian Patent Office, Russian Office Action dated Oct. 15, 2013 for Russian Patent Application No. 2011111597/11(017082).

Chinese Patent Office, Chinese Office Action dated Oct. 14, 2013 for Chinese Patent Application No. 201080057339.5.

USPTO, Non-Final Office Action for U.S. Appl. No. 13/061,240 mailed Jul. 3, 2014.

USPTO, Final Office Action for U.S. Appl. No. 13/061,240 mailed Feb. 12, 2014.

* cited by examiner

FORCE TRANSMISSION FITTING FOR LIGHTWEIGHT COMPONENTS

CROSS REFERENCE TO RELATED APPLICATIONS

This is a continuation of International Application No. PCT/EP2010/069379, filed Dec. 10, 2010, which application claims priority to U.S. Provisional Patent Application No. 61/286,482, filed Dec. 15, 2009 and to German Patent Application No. 10 2009 058 359.9, filed Dec. 15, 2009, which are hereby incorporated by reference in their entirety.

TECHNICAL FIELD

The technical field relates to a force transmission or introduction fitting for lightweight constructional components, to a lightweight constructional component with such a force introduction fitting, to a method for manufacturing such a force introduction fitting, to the use of such a force introduction fitting for introducing forces into a sandwich component, and to an aircraft with installations comprising lightweight constructional components that are equipped with such force introduction fittings.

BACKGROUND

In modern means of transport, lightweight materials are used for a host of different installations, fixtures and auxiliary aerodynamic surfaces, which lightweight materials, apart from their light weight, also provide adequate or high strength. In particular in modern commercial aircraft, within the fuselage numerous objects comprising sandwich materials are conceived that comprise at least one core layer and one, two or more covering layers. Examples of this include the floor in a passenger cabin, a crew rest compartment, or stowage cabinets. In relatively highly-loaded structural components comprising lightweight materials in sandwich construction, dedicated load introduction locations are to be provided to which the structural components can be attached in order to enable reliable transmission of forces.

In the state of the art there is no weight-saving option of introducing concentrated loads, for example by means of a screw-type connection, to a lightweight honeycomb board without locally undertaking a solid core reinforcement at the load introduction position. The aforesaid is often implemented by bonding a solid component comprising a composite material or aluminum; as an alternative, transmission of lesser forces into a lightweight board could take place, which board comprises a honeycomb core to whose honeycomb cells a layer of honeycomb filling compound has been applied.

DE 3 827 279 A1 and EP 0 354 403 B1 show a protective wall, designed as a lightweight constructional component, for absorbing loads in a transport cabin of a vehicle, which protective wall is held on a structure of the aircraft fuselage by way of fittings. In each case the fittings have a relatively large surface that supports the respective lightweight constructional component.

In the context of uncompromising lightweight construction of such lightweight constructional components these known options may not provide a solution because integrating one or several such solid load introduction components contributes to a significant increase in the weight of the lightweight constructional components, although for technical implementation the surfaces projecting to connection elements would be sufficient for adequate load introduction into the lightweight constructional component. In addition, other objects, desirable features and characteristics will become apparent from the subsequent summary and detailed description, and the appended claims, taken in conjunction with the accompanying drawings and this background.

SUMMARY

It may thus be desirable to provide a force transmission or introduction fitting that makes possible as harmonic as possible a load introduction into lightweight constructional components, while at the same time being of a lightweight nature and economical to manufacture.

It may also be desirable to provide such a force introduction fitting in which the transmittable force can be set by a modification of the force introduction fitting, wherein such a modification may be carried out in a manner that is as economical or as cost-neutral as possible.

According to various embodiments, it may be desirable to provide an aircraft with installations that comprise lightweight constructional components that can be arranged with particularly light additional weight on the aircraft structure within the fuselage.

According to various aspects, a force introduction fitting according to the present disclosure comprises at least one axial force introduction surface, at least one radial force introduction surface, and at least one receiving means for holding the lightweight constructional component, wherein the axial force introduction surface and the radial force introduction surface enclose a hollow space, and the force introduction fitting according to the present disclosure forms a single-piece non-joined component.

In the region of the force introduction surfaces, the force introduction fitting according to the present teachings comprises wall-like structures that can comprise predetermined wall thicknesses, and that are delimited to the outside by the force introduction surfaces.

The radial force introduction surface is generally equipped to establish a two-dimensional integral connection with the lightweight constructional component, wherein an adhesive connection can be employed. By designing the size and shape of the radial force introduction surface, the force that can be transmitted to the force introduction fitting can be predetermined.

The force introduction fitting according to the present disclosure may assume any desired shape as long as there is a radial force transmission or introduction surface and an axial force transmission or introduction surface that are each suitable to transmit, or introduce into the force introduction fitting, bearing forces from the receiving means to the lightweight constructional component. If the lightweight constructional component is, for example, a planar sandwich panel, the external dimensions of the force introduction fitting according to the present disclosure may be adapted to the thickness of the sandwich panel or of a core layer in the sandwich panel in order to be able to implement harmonious integration of the force introduction fitting according to the present teachings. In one example, the axial force introduction surface may be equipped to deflect forces that are to be exerted perpendicularly to the lightweight constructional component to a shear force between the axial force introduction surface and the shear core of the lightweight constructional component, whereas the radial force introduction surface is equipped to be able to harmoniously transmit compressive forces or tensile forces from the parallel load introduction in the direction of extension of the sandwich panel to said sandwich panel.

The enclosed hollow space provides a degree of deformability of the force introduction fitting according to the present disclosure so that a relatively small sudden variation in rigidity between the force introduction fitting and the lightweight constructional component can be implemented. At the same time, as a result of the hollow space, the weight of the force introduction fitting is reduced to a minimum so that the force introduction fitting according to the present teachings contributes to the smallest possible increase in the weight of the lightweight constructional component.

According to various exemplary embodiments, the receiving means of the force introduction fitting can be designed as a hole that is arranged in the at least one axial force introduction surface. Attachment of the lightweight constructional component may take place by means of a pin or the like that may be fed through this hole and that may be tensioned to the force introduction fitting according to the present teachings. To this effect the opening for receiving a pin or bolt may also comprise a thread. As an alternative, other attachment means may also be fed through the opening and may be affixed.

According to another exemplary embodiment, the receiving means of the force introduction fitting may be designed as a bushing that corresponds to an opening in the at least one axial force introduction surface. In this manner, bearing or guiding of the force introduction fitting according to the present teachings can take place.

In one of various exemplary embodiments, the force introduction fitting can be designed so as to be disc-shaped or can-shaped. As already mentioned above, the height of the force introduction fitting according to the present disclosure may be adjusted to the thickness of the lightweight constructional component, so that the force introduction fitting may be integrated, for example so as to be flush, in a lightweight constructional component, which may, for example, be designed as a sandwich panel. Because of the disc-shaped or can-shaped design the axial load receiving surface may be designed as a cylinder jacket, while the at least one radial force introduction surface may be designed as a disc that is arranged on a top and/or bottom of the cylinder jacket. The radial force introduction surfaces can be connected over the entire surface to the axial force introduction surface in an integral design without any joints. With such a design the cross section of the hollow space on potential kink points remains completely or at least largely intact when subjected to bending forces. Thus, greater bending forces, tensile forces and transverse forces can be introduced into the force introduction fitting according to the present disclosure than would otherwise be possible in a design with individual components.

According to one of various exemplary embodiments, the force introduction fitting may be designed so as to be symmetrical to the longitudinal axis. The longitudinal axis may be arranged so as to be concentric to the receiving means. The form of the radial force introduction surface and of the axial force introduction surface can be selected at will, with either round or angular forms being able to be used.

In another of various exemplary embodiments, the force introduction fitting according to the present teachings may comprise a roughened surface. This makes possible advantageous bonding to the lightweight constructional component, for example between a core layer of the lightweight constructional component and the axial force introduction surface or between a covering layer of the lightweight constructional component and a radial force introduction surface.

According to various exemplary embodiments, the wall thickness of the force introduction fitting according to the present disclosure, in the region of the at least one radial force introduction surface, radially decreases towards the outside when viewed from a longitudinal axis. In this manner the elastic/plastic deformability of the force introduction fitting according to the present disclosure is increased so that, increasingly, tensile forces and compressive forces can be introduced into the lightweight constructional component, for example into the covering layers of sandwich panels. The occurrence of shear of transverse forces that are directed to a core element is reduced, which is beneficial to the overall strength of the compound structure.

In another exemplary embodiment, stiffening elements are arranged in the interior of the hollow space of the force introduction fitting and are connected to the at least one axial force introduction surface and/or the at least one radial force introduction surface. The stiffening elements may comprise various forms and may extend both in axial direction, being formed as solid intermediate ribs, and as bar-shaped stiffening elements that form a framework structure within the hollow space. The object of these stiffening elements is to improve the force transmission between the receiving means and radial force introduction surfaces and the axial force introduction surface. By adjusting the type, shape and number of stiffening elements the deformability of the force introduction fitting according to the present disclosure can be influenced at least to some extent.

In one of various exemplary embodiments, the force introduction fitting according to the present disclosure comprises two radial force introduction surfaces that are designed as disc-shaped elements and that by means of an axial force introduction surface are supplemented to form a closed surface of the force introduction fitting according to the present disclosure. In this manner quite a simple structure with a particularly advantageous simple option of integration into an existing lightweight constructional component is achieved. By specifying the individual wall thicknesses of the force introduction fitting according to the present disclosure, the forces that can be absorbed by the force introduction surfaces arranged in the aforesaid can be dimensioned.

According to another exemplary embodiment, the force introduction fitting is made from a meltable material, which material makes it possible to produce the force introduction fitting in layers, one above the other and bonded to each other, as described later in the context of a manufacturing method according to the present teachings. To this effect any meltable material is suitable, for example plastic or metal.

In another one of various embodiments, the hollow space of the force introduction fitting comprises at least one opening that connects the hollow space with a medium surrounding the force introduction fitting. Consequently, this medium, for example air, can enter the hollow space and can achieve pressure equalization. Thus, such a force introduction fitting can, for example, be used at high altitudes or in deep waters because it is generally not possible for a pressure differential to build up between the medium and the hollow space. Such pressure differentials could result in stress within the force introduction fitting, which stress could additionally load the force introduction fitting. Consequently, the bending forces that can be transmitted by a force introduction fitting subjected to stress can be less than is the case in a force introduction fitting that is not subjected to stress.

According to one of various exemplary embodiments, the force introduction fitting according to the present disclosure comprises at least one opening that is dimensioned in such a manner that a granulate of meltable material, which granulate is required for manufacturing the force introduction fitting, can be removed from the hollow space. As already mentioned above, the force introduction fitting can be produced in a generative layer construction method. In this method, powder or granulate of meltable material is applied in layers, wherein a laser preferably fully melts the contour of the force introduction fitting. Since, due to the inherent characteristics of this manufacturing method, the non-melted granulate remains on a substrate plate until completion of the force introduction fitting, during the production of a hollow space this granulate is enclosed in this hollow space. At least for reasons associated with weight and costs it is desirable to remove this granulate from the hollow space, if at all possible without any residue remaining. This can be achieved by way of the at least one such opening that may be arranged in the at least one radial force introduction surface or in the at least one axial force introduction surface.

The meltable material may be realized at least as a material from the group comprising tool steel, stainless steel, steel, titanium, aluminum and iron-cobalt-nickel alloys and alloys or mixtures of these materials. With the use of these materials, which can be used without binder additions, complete melting of the materials available in the powder is possible. Consequently, approximately 100% component density can result so that a force introduction fitting can be manufactured whose characteristic mechanical values to the greatest possible extent correspond to the specifications of the material. This means that, for example in the case of manufacturing the force introduction fitting from a titanium alloy, the characteristic values, for example elasticity, which form the basis of the corresponding titanium alloy can also form the basis of the force introduction fitting.

According to another exemplary embodiment, a force introduction fitting is manufactured by means of a generative layer construction method, in particular by means of a selective laser melting (also known under the abbreviation "SLM") method. In this method a wall is formed that encloses a hollow space of the force introduction fitting at least to some extent. Furthermore, a number of stiffening elements within the hollow space and across a direction of extension of the force introduction fitting may be formed in such a manner that the stiffening elements may absorb at least some of the bending forces, axial forces and radial forces acting on a force introduction fitting. In addition, the stiffening elements are made in one piece with the wall, wherein both the wall and the stiffening elements are made from a meltable material by means of the layer construction method.

In this arrangement the force introduction fitting can be constructed layer by layer, wherein in each case a layer of a material in powder form can be applied to an already processed part of the force introduction fitting and can then be locally melted so that during subsequent solidification it can bond to the aforesaid. For example, by means of laser beams any three-dimensional geometries with undercuts can be produced. Thus the manufacture of such an advantageous force introduction fitting is possible, which force introduction fitting cannot be manufactured in conventional mechanical or casting technology engineering.

Usually, the manufacture of such products necessitates the presence of the geometric data of said product in three-dimensional form and as layer data. From the present CAD data of the component, by so-called "slicing," numerous layers are produced. In this manner a force introduction fitting according to the present disclosure is manufactured whose mechanical characteristics are superior to all known force introduction fittings as far as its strength and light weight are concerned.

In order to obtain optimal area support the force introduction fitting according to the present disclosure is built up obliquely by a laser. In a disc-shaped or can-shaped design, thus neither the axial force introduction surface nor the radial force introduction surface rests on the substrate plate.

According to various embodiments, a lightweight constructional component with at least one force introduction fitting according to the present disclosure can also be provided.

An aircraft with at least one installation object, wherein the installation object comprises at least one lightweight constructional component with at least one force introduction fitting according to the present teachings is also provided. In a modern commercial aircraft, for example the fairing at the transition between the wing and the fuselage (also referred to as "belly fairing"), may be affixed to the structure of the aircraft by way of several force introduction fittings according to the present teachings. Furthermore, many lightweight constructional components in the interior of the cabin of the aircraft can be affixed to the fuselage structure, for example floor panels, cabin ceiling linings, monuments or monument components, partition walls and a multitude of other types of interior fitting components.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
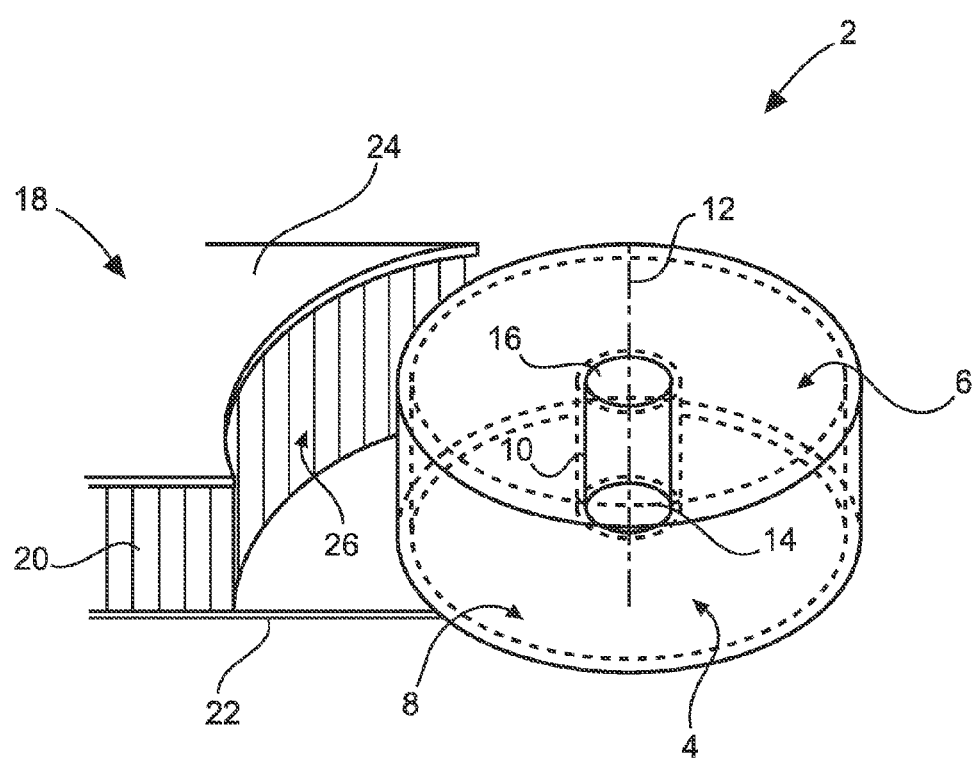
FIG. 1 shows one of various exemplary embodiment of a force introduction fitting according to the present teachings.

FIG. 1 shows a three-dimensional view of a force introduction fitting 2 according to the present disclosure, which force introduction fitting 2 comprises a can-shaped design. The force introduction fitting 2 according to the present disclosure comprises an axial force introduction surface 4 and two radial force introduction surfaces 6 and 8 that are arranged so as to be concentric to each other and that are offset from each other in axial direction. The radial force introduction surfaces 6 and 8 are formed by an outside of a disc-shaped component with a flat, sheet-metal-like or plate-like design, wherein the aforesaid form an integral closed body in the form of the force introduction fitting 2 according to the present disclosure, with at least one further component that comprises an axial force introduction surface 4.

In this context the term "components" should not be interpreted to mean that the force introduction surfaces 4, 6 and 8 are formed on separately manufactured components; instead, according to the principles of the present disclosure the term "components" refers to regions of the single-piece force introduction fitting according to the present teachings, which regions are functionally separate from each other and separate from each other in their spatial alignment.

The force introduction surfaces 4, 6 and 8 enclose a hollow space in which a bushing 10 is centrally arranged, with the longitudinal axis 12 of said bushing 10 being arranged concentrically to the longitudinal axis of the force introduction fitting 2. At each of its two ends the bushing 10 in each case comprises an opening 14 and 16, wherein said openings 14 and 16 are accessible to the outside by way of the radial force introduction surfaces 6 and 8. Consequently, the bushing 10 can be used as a receiving means; for example, in that location a pin or the like may be used in order to hold the force introduction fitting 2 according to the present disclosure on a fixed point, or to affix other components thereto. The bushing 10 may be designed as a cylinder sleeve or as a threaded bushing.

The single-part construction of the shown force introduction fitting according to the present disclosure can be achieved by means of an SLM method.

Somewhat further to the left-hand side, FIG. 1 shows a section of a lightweight constructional component 18, which section comprises a core layer 20 which, for example, comprises a honeycomb core as well as two covering layers 22 and 24 that cover the core layer 20 towards the outside. The lightweight constructional component 18 further comprises a receiving surface 26 that comprises a corresponding form with the axial force introduction surface 4 of the force introduction fitting 2. As a result of this the force introduction fitting 2 according to the present disclosure can conform to the lightweight constructional component 18, and by means of a suitable connecting means, for example an adhesive, can be firmly connected to the lightweight constructional component 2. The strength of such a connection is substantially predetermined by the size of the axial force introduction surface 4 or by the receiving surface 26. A force introduction fitting according to the present teachings may thus be adapted, by dimensioning the axial force introduction surface 4, to a force to be absorbed. With the use of an SLM method for producing the force introduction fitting 2 according to the present disclosure, hardly-measurable additional costs are generated as a result of this.

The force introduction fitting 2 according to the present disclosure is generally designed in such a manner that the axial force introduction surface 4 in longitudinal direction of the force introduction fitting 2 according to the present teachings extends over the same height as the core layer 20 so that the force introduction fitting 2 according to the present disclosure together with the core layer 20 can be covered by two covering layers 22 and 24 so that they are flush. In this manner the force introduction fitting 2 according to the present disclosure would form an integral part with the light constructional component 18. Generally, to this effect each of the force introduction surfaces 4, 6 and 8 comprises a roughened surface so that particularly good adhesion to the core layer 20 and the covering layers 22 and 24 with the use of a suitable connecting means can take place.

Figure 2:
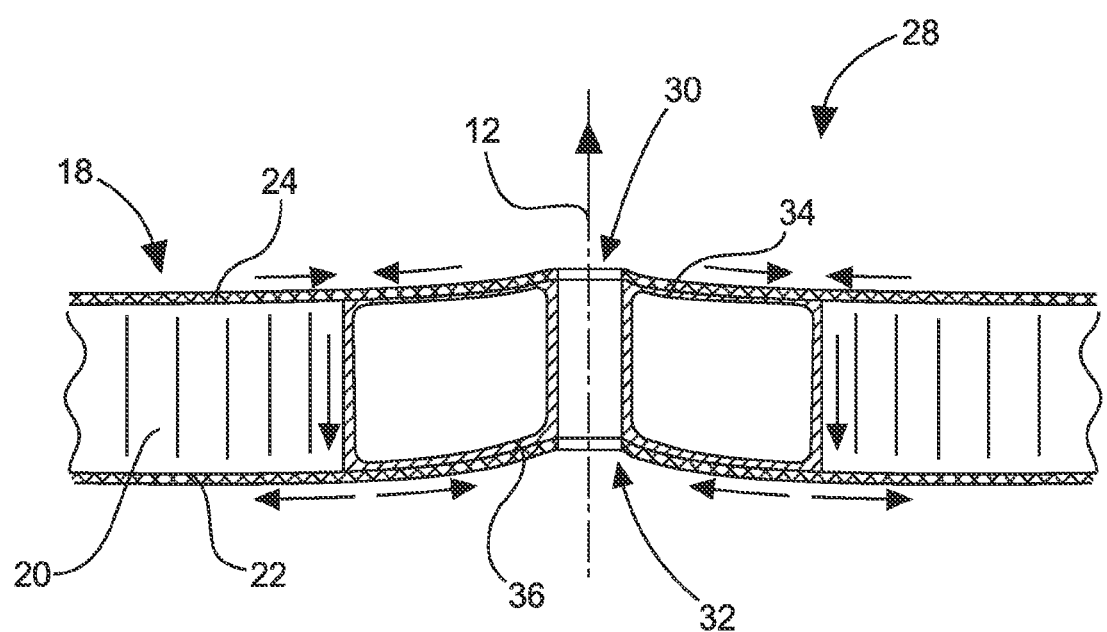
FIG. 2 shows another exemplary embodiment of a force introduction fitting according to the present teachings in an arrangement installed in a lightweight constructional component.

FIG. 2 shows a force introduction fitting 28 according to the present teachings, which force introduction fitting 28 is fully integrated in a lightweight constructional component 18 and is deformed by an axial force. The illustration shows that the force introduction fitting 28 according to the present disclosure extends over the same height as the core layer 20 of the lightweight constructional component 18 so that the covering layers 22 and 24 project completely over the core layer 20 and over the force introduction fitting 28 according to the present disclosure. Accordingly, from the outside the lightweight constructional component 18 may be visible, as are the openings 30 and 32 of the force introduction fitting 28 according to the present teachings.

The exemplary embodiment shown in this illustration comprises a special feature in that the wall thicknesses of the components comprising the radial force introduction surfaces 34 and 36 radially taper off from the longitudinal axis 12 towards the outside, which corresponds to a strength distribution that corresponds to the loads experienced, or at least approximates the aforesaid. On average, the wall thicknesses may, for example, range from about 2 to about 10% of the overall height of the force introduction fitting 28 according to the present disclosure. By dimensioning the wall thicknesses and the course of the wall thicknesses of the components comprising the radial force introduction surfaces 34 and 36, the strength of the force introduction fitting 28 can be adjusted to the forces to be absorbed. With the use of an SLM method for manufacturing the force introduction fitting 28 according to the present teachings no measurable additional costs arise as a result of this.

Figure 3:
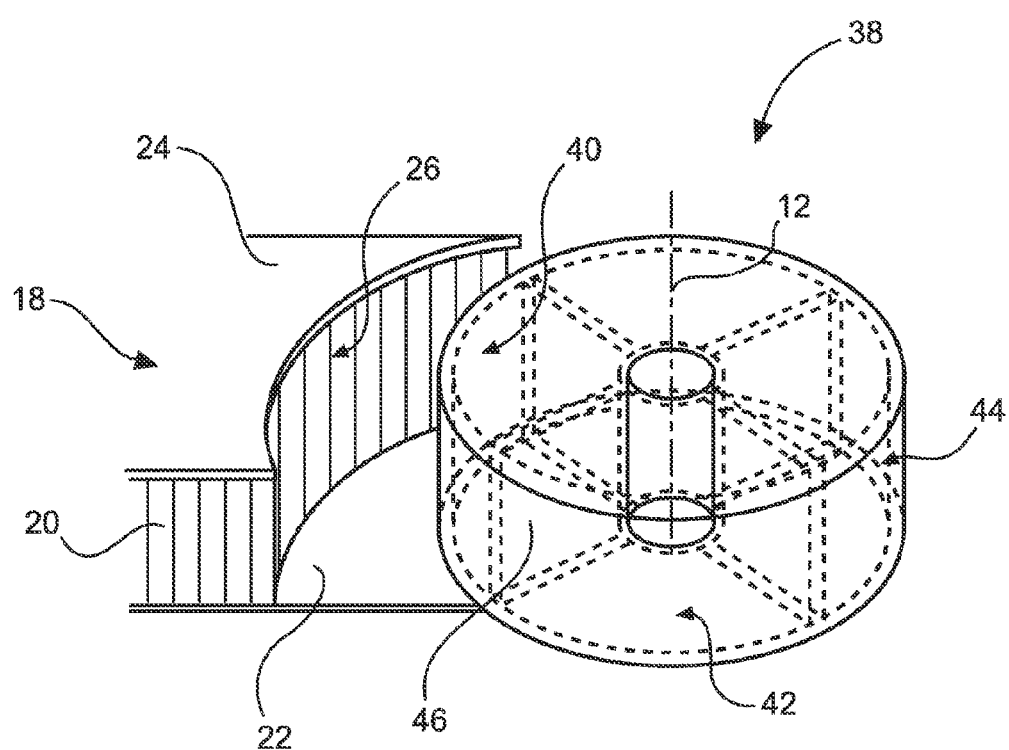
FIG. 3 shows another exemplary embodiment of a force introduction fitting according to the present teachings.

FIG. 3 shows a further exemplary embodiment of a force introduction fitting 38 according to the present disclosure, which force introduction fitting 38, apart from two radial force introduction surfaces 40 and 42, comprises an axial force introduction surface 44, with the force introduction surfaces 40, 42 and 44 enclosing a hollow space in which additional reinforcement elements 46 are arranged. In the example shown, the reinforcement elements 46 extend in a direction parallel to the longitudinal axis 12 of the force introduction fitting 38 according to the present teachings between the two radial force introduction surfaces 40 and 42 that delimit the force introduction fitting 38, and together with the components that comprise the radial force introduction surfaces 40 and 42 form a single-piece integral structure. The average person skilled in the art will understand that any other forms and alignments of the reinforcement elements 46 can also be implemented. By applying an SLM method for manufacturing the force introduction fitting 38 according to the present disclosure, very little to no additional costs arise, and adjustment of the force introduction fitting 38 according to the present teachings can be implemented in a completely flexible manner.

Figure 4A:
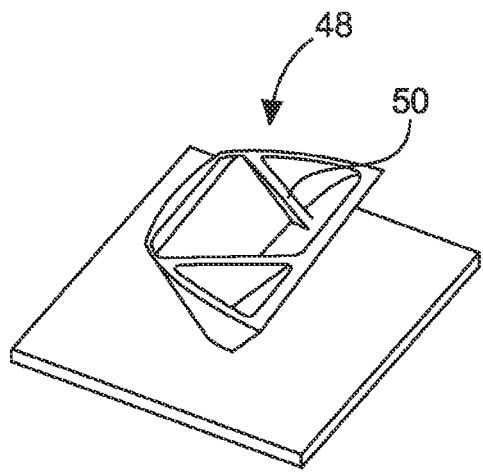
FIG. 4a-FIG. 4c show a three-dimensional progressive production view of a force introduction fitting in which the force introduction fitting and one or more stiffening elements are produced in layers by a selective laser melting method according to the present teachings.
Figure 4B:
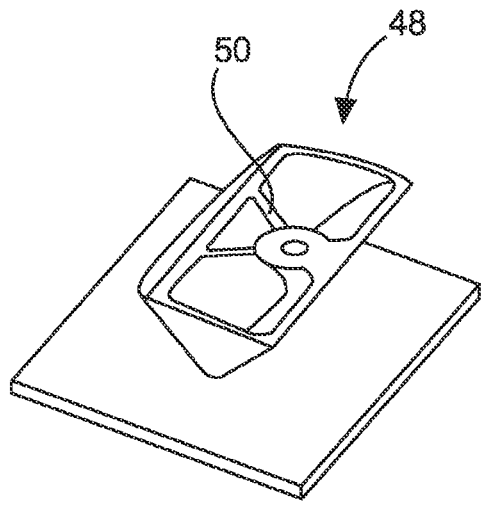
Figure 4C:
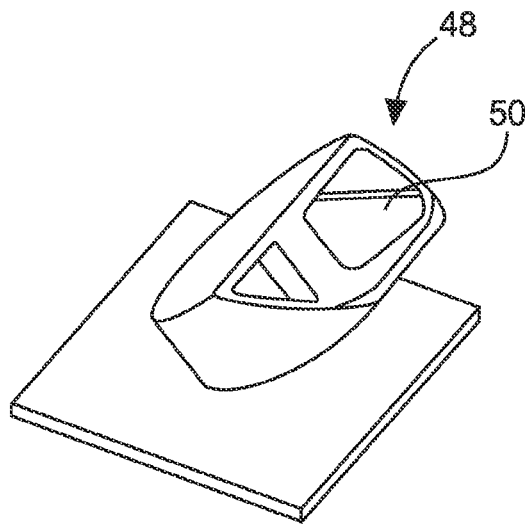

With reference to a three-dimensional progressive production view, FIGS. 4a-4c show the manner in which a force introduction fitting 48 according to the present disclosure with stiffening elements 50 that are integrated in the hollow space can be manufactured. Such a complex form can be produced in layers by means of a selective laser melting method (SLM) in that the contours of the force introduction fitting are built up in layers in a metal powder bed by local heating with the use of a laser beam. Powder that is not required is removed or blown from the hollow spaces that arise during manufacture. Consequently, in contrast to the state of the art, no separate manufacture of individual components is necessary, which individual components would later have to be interconnected. This means that the force introduction fitting 48 according to the present disclosure is provided as a single one-piece component in an integral design; no mechanical stress arises as a result of welding or different local heating of the material.

This manufacturing method comprises a special feature in that such a component can be produced in a computer-controlled manner directly from CAD data, which takes place in a cost-effective manner right from the very first component, because no setup costs arise as a result of required adaptation to production machines.

Figure 5:
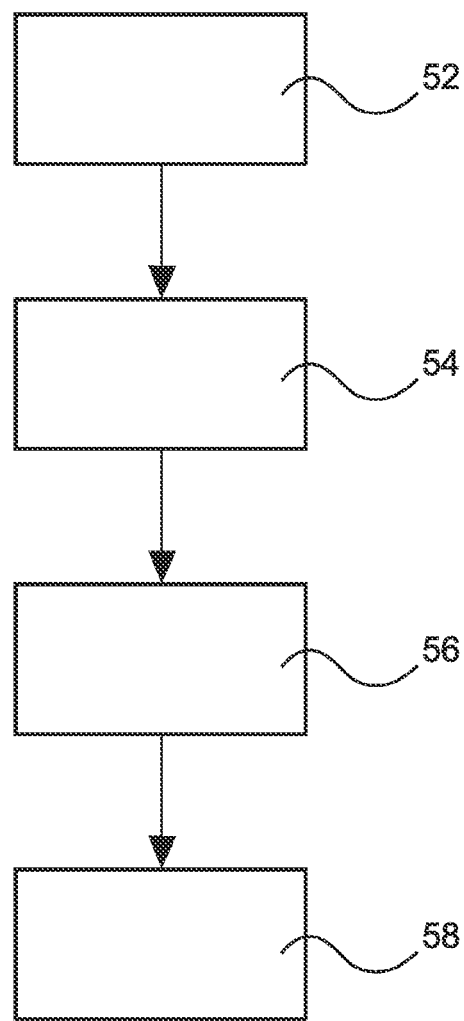
FIG. 5 shows a diagrammatic view of a method according to the present teachings.

FIG. 5 illustrates the manufacturing method according to one of various exemplary embodiments of the present disclosure. Production of the force introduction fitting according to the present disclosure takes place with the use of a selective laser melting method (SLM method). In this process, with the use of so-called "slicing", from available CAD data the force introduction fitting is produced by means of numerous layers, which results in a single-piece component.

A powder or granulate is applied at 52 at a thickness of approximately 0.001 millimeters (mm) to approximately 0.2 mm over the entire surface of a construction platform by means of, for example, a doctor blade. The layers are melted at 54 into the powder bed by controlling a suitable laser beam according to the sliced contour of the support. Subsequently, a substrate platform is lowered at 56 slightly, and then a new layer of powder is applied. The powder is provided by a powder platform being raised, or as a supply in the doctor blade. Layering takes place in vertical direction. The energy that is supplied by the laser is absorbed by the powder and results in locally limited melting of powder particles.

Since the SLM method requires melting of the individual layers in a powder bed by controlling a laser beam, powder remains in hollow spaces and is removed 58, after manufacture, through corresponding openings.

As a material for manufacturing the force introduction fitting according to the present disclosure, for example, an aluminum alloy such as AlZn6MgCu, AlZn5,5MgCu or AlZn6CuMgZr, high-strength steel or stainless steel such as A 17Cr-4Ni-3Cu, or, for example, a titanium alloy TiAl6V4 may be used.

Figure 6:
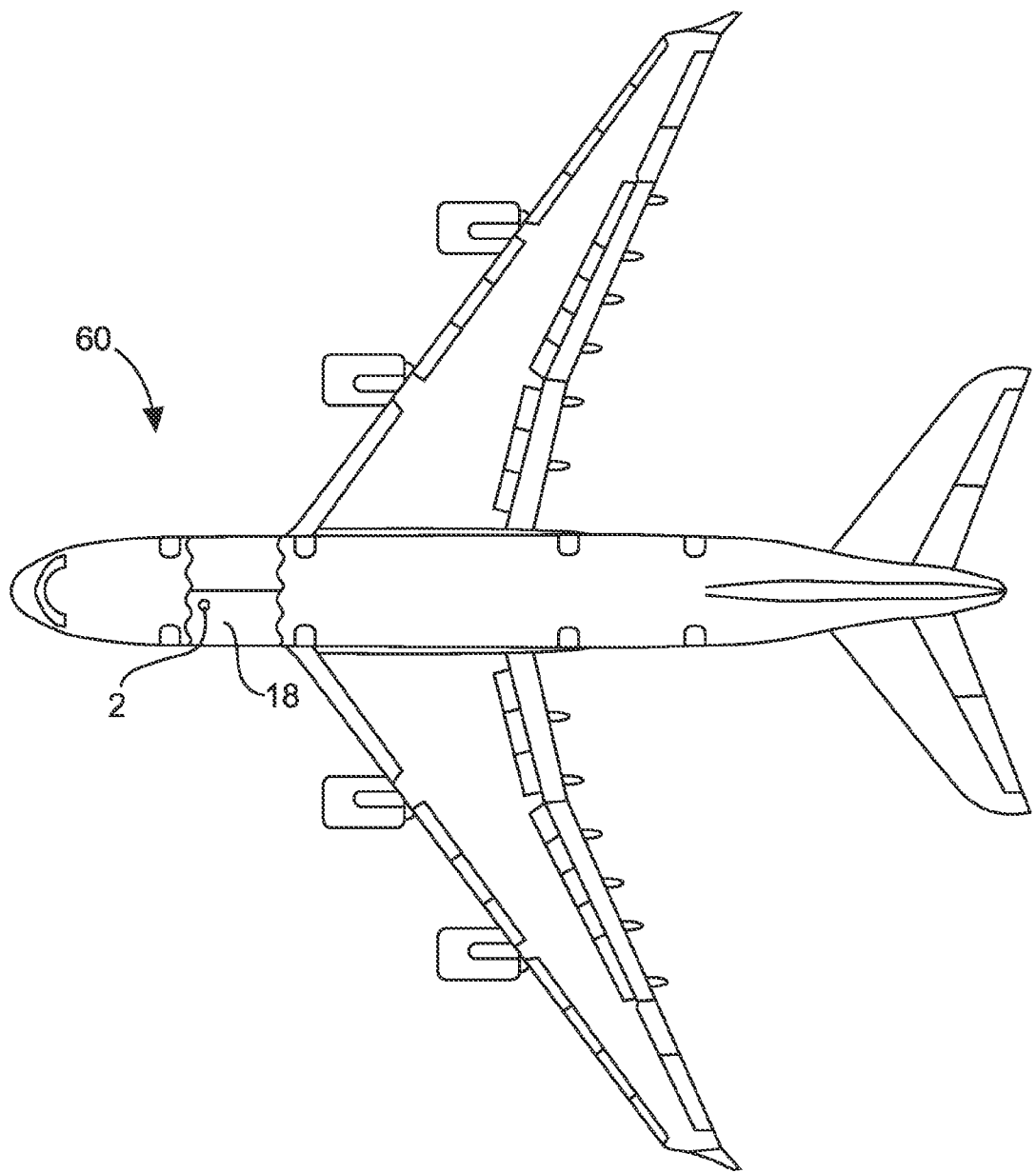
FIG. 6 shows an aircraft with at least one installation object with at least one lightweight constructional component that comprises at least one force introduction fitting according to the present teachings.

Finally, FIG. 6 shows aircraft 60 in which the aircraft fuselage comprises several installations implemented by means of lightweight constructional components 18, wherein these lightweight constructional components in each case as an example comprise at least one force introduction fitting 2 according to the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A force introduction fitting for lightweight constructional components, the force introduction fitting comprising:
    two disc-shaped radial force introduction plates;
    an axial force introduction surface in the form of a cylinder jacket having a first end and a second end, with one of the two disc-shaped radial force introduction plates connected to the first end and the other of the two disc-shaped radial force introduction plates connected to the second end, the second end opposite the first end; and
    a bushing that couples the force introduction fitting to a lightweight constructional component,
    at least one stiffening element connected to at least one of the two disc-shaped radial force introduction plates and to the axial force introduction surface;
    wherein the radial force introduction plates, the axial force introduction surface and the bushing define and enclose a hollow space, the at least one stiffening element arranged in the interior of the hollow space, and the force introduction fitting is a cylindrical single-piece non-joined integral component.

2. The force introduction fitting of claim 1, wherein at least one of the radial force introduction plates and the axial force introduction surface has a rough surface.

3. The force introduction fitting of claim 1, wherein the stiffening element is formed as a planar component.

4. The force introduction fitting of claim 1, wherein the stiffening element is formed as a rectangular component.

5. The force introduction fitting of claim 1, in which a wall thickness of the force introduction fitting in a region of at least one of the radial force introduction plates radially tapers off from a longitudinal axis towards an outside.

6. The force introduction fitting of claim 1, in which the bushing extends into the radial force introduction plates.

7. The force introduction fitting of claim 1, wherein the force introduction fitting is produced by generative layer construction.

8. The force introduction fitting of claim 1, wherein the hollow space extends about a circumference of the force introduction fitting.

9. The force introduction fitting of claim 1, wherein the two-disc shaped radial force introduction plates each include an inner peripheral surface and an outer peripheral surface, and the bushing is connected to the inner peripheral surface of each of the two-disc shaped radial force introduction plates.

10. The force introduction fitting of claim 9, wherein the axial force introduction surface is connected to each of the two-disc shaped radial force introduction plates along the outer peripheral surface of the two-disc shaped radial force introduction plates.

11. A lightweight constructional component assembly, comprising:
    at least one core layer defining a receiving surface;
    at least one covering layer coupled to the core layer so as to extend beyond the receiving surface; and
    at least one force introduction fitting having two disc-shaped radial force introduction surfaces, an axial force introduction surface in the form of a cylinder jacket and at least one bushing that extends into the radial force introduction surfaces, the radial force introduction surfaces, the axial force introduction surface and the at least one bushing define and enclose a hollow space, and the force introduction fitting is a cylindrical single-piece non-joined integral component,
    wherein the receiving surface cooperates with the axial force introduction surface of the force introduction fitting, and the at least one covering layer of the force introduction fitting covers the core layer and the force introduction fitting, and the receiving surface conforms to the force introduction fitting so that the core layer and the force introduction fitting are flush.

12. The lightweight constructional component of claim 11, wherein the lightweight constructional component is installed in an aircraft.

13. The lightweight constructional component of claim 11, further comprising at least one stiffening element arranged in the interior of the hollow space.

14. The lightweight constructional component of claim 11, wherein the force introduction fitting is formed with a generative layer construction.

15. The lightweight constructional component of claim 14, wherein the force introduction fitting is produced in layers in a metal powder bed by local heating with a laser beam.

16. An aircraft with at least one installation object comprising:
 at least one lightweight constructional component; and
 at least one force introduction fitting coupled to the at least one lightweight constructional component that holds the lightweight constructional component to form the at least one installation object, the force introduction fitting including two disc-shaped radial force introduction plates, at least one axial force introduction surface in the form of a cylinder jacket having a first end and a second end, with one of the two disc-shaped radial force introduction plates connected to the first end and the other of the two disc-shaped radial force introduction plates connected to the second end, and at least one bushing that extends into the radial force introduction plates, the at least one bushing couples the force introduction fitting to the lightweight constructional component, the radial force introduction plates, the axial force introduction surface and the at least one bushing enclose a hollow space, with at least one stiffening element arranged in the interior of the hollow space and the force introduction fitting forms a cylindrical single-piece non-joined integral component.

* * * * *